United States Patent [19]

Richards et al.

[11] Patent Number: 5,198,902
[45] Date of Patent: Mar. 30, 1993

[54] APPARATUS AND METHOD FOR PROCESSING A VIDEO SIGNAL CONTAINING SINGLE FRAME ANIMATION MATERIAL

[75] Inventors: John W. Richards, Chilbolton, Near Stockbridge; Stephen M. Keating, Reading, both of England; John Galt, Glendale, Calif.

[73] Assignee: Sony Broadcast & Communications Limited, Basingstoke, England

[21] Appl. No.: 744,265

[22] Filed: Aug. 13, 1991

[30] Foreign Application Priority Data

Aug. 31, 1990 [GB] United Kingdom ............... 9019021

[51] Int. Cl.$^5$ ............... H04N 5/262; H04N 5/272; H04N 7/18
[52] U.S. Cl. ............... 358/183; 358/22; 358/105; 352/87; 352/50
[58] Field of Search ............... 358/105, 22, 183, 97, 358/54, 214, 216, 227, 228, 182; 352/87, 50-54; 340/728, 724, 726

[56] References Cited

U.S. PATENT DOCUMENTS

| | | | |
|---|---|---|---|
| 4,539,594 | 9/1985 | Illetschko | 358/167 |
| 4,549,213 | 10/1985 | Illetschko | 358/167 |
| 4,581,642 | 4/1986 | Poetsch et al. | 358/167 |
| 4,606,625 | 8/1986 | Geshwind | 352/85 |
| 4,639,784 | 1/1987 | Fling | 358/167 |
| 4,668,986 | 5/1987 | Furukawa | 358/105 |
| 4,698,682 | 10/1987 | Astle | 358/182 |
| 4,952,051 | 8/1990 | Lovell et al. | 352/87 |
| 5,029,997 | 7/1991 | Faroudja | 352/87 |
| 5,083,203 | 1/1992 | Ko et al. | 358/105 |

*Primary Examiner*—James J. Groody
*Assistant Examiner*—Glenton B. Burgess
*Attorney, Agent, or Firm*—Alvin Sinderbrand; William S. Frommer

[57] ABSTRACT

Apparatus for processing a video signal derived by single frame animation for subsequent merging with live action material, comprises a motion vector estimator (11) for deriving motion vectors in dependence on motion in the picture sequence represented by the video signal, and an interpolator (12) and associated circuits (14 to 16) for blurring the images represented by the video signal of objects in the picture sequence so determined as being in motion in dependence on the motion vectors.

13 Claims, 3 Drawing Sheets

FIG.1
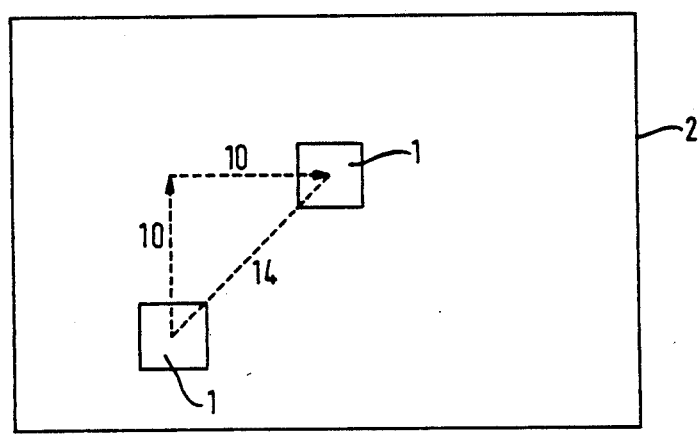
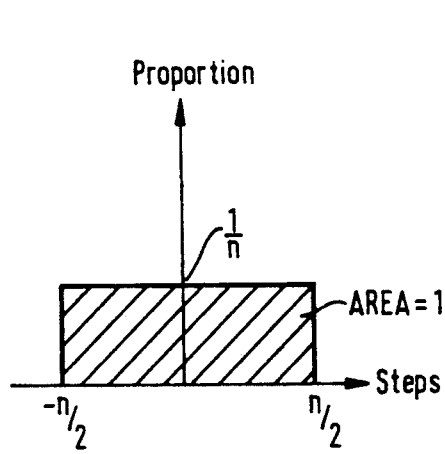
FIG.2A
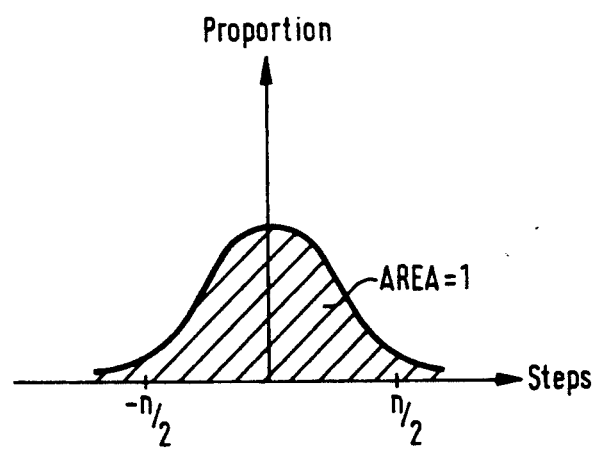
FIG.2B

APPARATUS AND METHOD FOR PROCESSING A VIDEO SIGNAL CONTAINING SINGLE FRAME ANIMATION MATERIAL

BACKGROUND OF THE INVENTION

1. Field of the Invention

This invention relates to movie film and video production, and more particularly to methods of and apparatus for processing a video signal in such production.

2. Description of the Prior Art

In the special effects now commonly used for making films for cinema or television viewing, it is often required to merge recorded live action with material which has been recorded using models. By the use of such special effects, it is possible, for example, to create the illusion of interaction between a live human actor and a two-meter white rabbit. This is achieved by filming the actor and the rabbit separately, the rabbit being a small model which is filmed using a single frame animation. The two resulting films are then merged into a single film using a matting technique. This procedure, and in particular the matting technique, is capable of substantial extension. In, for example, a science fiction film, a substantial number of independent models, which may for example represent a fleet of spacecraft, may be used, with a separate stage of matting for each model.

All these procedures, although they are often complex, time-consuming and expensive to carry out, are well known and are in common use.

There is, however, a significant problem with these procedures; which is that the final film often does not look correct because of differences in the movement characteristics of the live action material and the single frame animation material. Thus the animated material often has movement characteristics which are different from those of the live action material, and in consequence they look unnatural.

This problem arises because the live action material will have been recorded either with a movie film camera which has a finite shutter speed, typically 1/48 second for a standard movie camera with a 180° shutter, or a video camera which has an effective shutter speed of one video field period, which is generally 1/50 or 1/60 second. In consequence any movement occurring while the shutter is open is integrated on the film or in the video signal, and the result is that on reproduction the image of any object that is in motion in the picture sequence is slightly blurred. When viewed, this slightly blurred image results in a natural characteristic for the movement. The effect may be considered as a temporal pre-filtering of the image prior to sampling.

In single frame animation, there is no such integration of the image. This is because although the movie film camera or video camera used has a finite shutter speed, the model does not move during the period that the shutter is open.

There have been some proposals aimed at overcoming this problem. One is the so-called "Go-Motion" technique which involves moving the model during the period that the shutter of the camera is open. In this technique the model is moved by devices such as small hydraulic motors, which are of course kept hidden from the camera. Such techniques are very time-consuming and expensive, not only because of the additional equipment which is required and the substantial labour involved in operating it, but also due to the complexity resulting from the need to plot the trajectories of all movements in detail before exposing each frame.

SUMMARY OF THE INVENTION

One object of the present invention is to provide a method of processing a video signal derived by single frame animation in which the above problem of unnatural movement is overcome.

Another object of the present invention is to provide apparatus for processing a video signal derived by single frame animation in which the above problem of unnatural movement is overcome.

Another object of the present invention is to provide apparatus for processing a video signal derived by single frame animation to add blur to objects determined as being in motion.

According to the present invention there is provided a method of processing a video signal derived by single frame animation, the method comprising the steps of:
determining from said video signal motion in the picture sequence represented by said video signal; and
blurring the images represented by said video signal of objects in said picture sequence so determined as being in motion.

According to the present invention there is also provided apparatus for processing a video signal derived by single frame animation, the apparatus comprising:
a motion vector estimator for deriving motion vectors from said video signal in dependence on motion in the picture sequence represented by said video signal; and
means for blurring the images represented by said video signal of objects in said picture sequence so determined as being in motion in dependence on said motion vectors.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 shows diagrammatically an example of the movement of an object within an image;

FIGS. 2A and 2B show respective weighting functions of two shutters;

DESCRIPTION OF THE PREFERRED EMBODIMENT

Figure 3A:
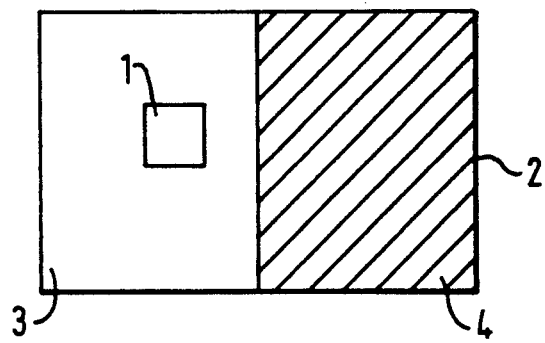
FIGS. 3A to 3D show diagrammatically another example of the movement of an object within an image.
Figure 3B:
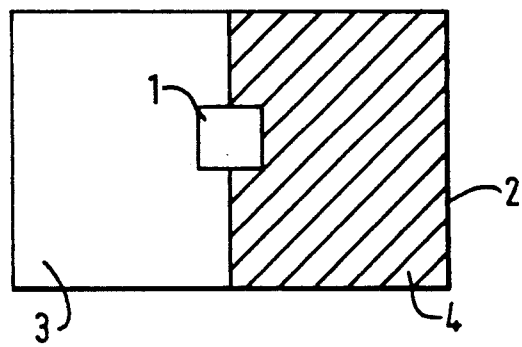

Put very briefly, the embodiment to be described is effective to reduce the above-mentioned problem of unnatural movement of a model in single frame animation material which has been merged with live action material, by blurring the image of those parts of the model which are moving.

The required procedure can be considered as a series of processing steps which are performed with the single frame animation material in the form of a video signal, preferably a high definition video signal to give image quality similar to that of photographically filmed live action material:

Firstly, the motion of the model in the picture sequence represented by the video signal is determined, for example from current, previous and next frame data. This identifies the parts of the model which are moving and their direction of motion.

Secondly, the trajectory of the motion is calculated in relation to the desired shutter-open time. For compatibility with live action material filmed using a standard movie camera this would generally be 1/48 second, but 1/50 or 1/60 second would be used if the live action material were filmed using a video camera.

Thirdly, the trajectory of the motion is sub-divided into a plurality of small steps. Preferably, each step is equivalent to one pixel length. Referring to FIG. 1, if, for example, the motion of the object 1 moving within an overall picture 2 corresponding to a video frame were ten pixels upwards and ten pixels to the right, then the trajectory might be sub-divided into fourteen steps of one pixel length in the diagonal direction. This is indicated in the FIG. 1 by the numbers adjacent to the dotted lines.

Fourthly, a video frame store is used to accumulate the value of each pixel in the picture 2 with the moving object 1 offset by each step in the sub-divided trajectory. For the example of FIG. 1 there would be fourteen steps. All the data values are summed, and then divided by the number of steps to obtain an average data value.

It should be noted that the fourth step, that is the accumulation step, requires that both previous and next frame image data are available, because objects revealed, that is to say objects which become uncovered as a result of the motion of the object 1 will need to be selected for accumulation in the frame store. The overall effect is that the images of those parts of the object 1 which are in motion are blurred or smeared over the shutter-open time.

The above outline assumes that the shutter opens and closes instantaneously, in other words that the shutter is such that to give a linear weighting function to the resulting image, as indicated in FIG. 2A. Thus if the motion of the object 1 (FIG. 1) is considered as being made up of n steps, then each of the n steps results in an identical light accumulation, that is exposure. To reproduce this, each of the individual data values to be summed is given the same weight.

Commonly, however, the shutter will not have such a characteristic, but will open to its full aperture over a finite period, and then close over a similar finite period, which may follow immediately on the first period, as indicated in FIG. 2B. If again the motion is considered is made up of n steps, then individual steps will have different light accumulations or exposures. To reproduce this effect, the data values which are to be summed need to be weighted with coefficients corresponding to the profile of the effective shutter opening or aperture.

Figure 3C:
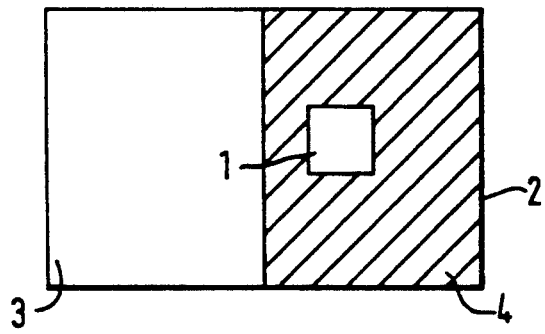

Referring to 3A to 3D, these illustrate a very simple example of the effect. In FIG. 3A, representing the previous frame, the object 1, which is assumed to be moving at uniform speed to the right, is shown positioned in the left half of the picture 2 against a light background 3. In FIG. 2B, representing the current frame, the object one has moved to the centre of the picture 2 where it overlaps the border between the light and a dark backgrounds 3 and 4. In FIG. 3C, which represents the next frame, the object 1 has moved to the right half of the picture 2 against the dark background 4.

Figure 3D:
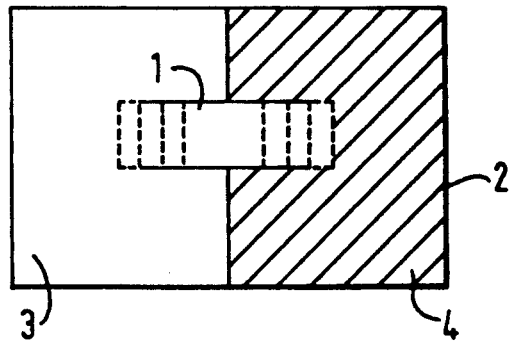

FIG. 3D shows the output picture 2 comprising the light and dark backgrounds as before, but with the object 1 represented by a new image combination made up of the sum of image data values corresponding to the backgrounds 3 and 4 and the object 1 in the selected weighted proportions.

In the above description it has been assumed that the number of steps allowed in the accumulation process is proportional to the degree of motion, but this is not essential. It is, for example, possible to keep the number of steps constant independent of the extent of the motion, which has the effect of giving coarser steps to high speed motion.

Figure 4:
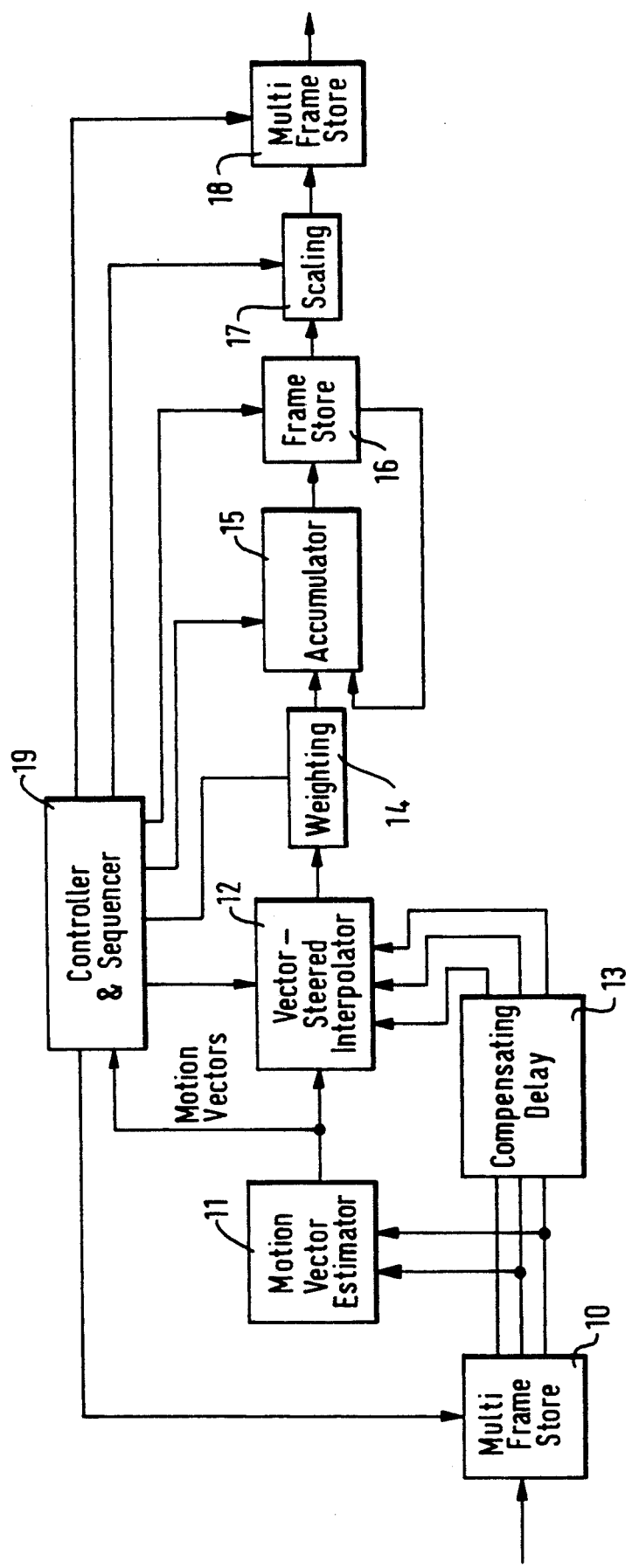
FIG. 4 shows in block diagrammatic form an embodiment of video processing apparatus according to the present invention.

The embodiment of video signal processing apparatus in accordance with the present invention will now be described with reference to FIG. 4, which shows the apparatus in block diagrammatic form. The apparatus comprises a multiframe store 10, which supplies frame data to a motion vector estimator 11, which derives motion vectors for supply to a vector-steered interpolator 12. Frame data from the multiframe store 10 are also supplied by way of a compensating delay 13 to the interpolator 12. The output of the interpolator 12 is supplied by way of a weighting device 14 and an accumulator 15 to a frame store 16. The output of the frame store 16 is supplied by way of a scaling device 17 to a further multiframe store 18 from which the composite output frames are derived. The apparatus further comprises and is controlled by a controller and sequencer 19 to which are supplied motion vectors from the motion vector estimator 11, and which supplies control outputs to the multiframe stores 10 and 18, to the interpolator 12, to the weighting device 14, to the accumulator 15, to the frame store 16 and to the scaling device 17. Finally, there is a feedback connection from the frame store 16 to the input of the accumulator 15.

The operation of the apparatus is as follows. Previous, present and next input frame data of the single frame animation material are held in the multiframe store 10, and the present and next input frame data are supplied to the motion vector estimator 11 to derive motion vectors for the parts of the image which are in motion, the motion vectors being derived in a known manner, for example, by block matching.

The suitably-delayed previous, present and next input frame data are supplied to the interpolator 12, which can be of known form, and to which are also supplied the motion vectors, whereby new intervening frames are created by interpolation, in which new frames the moving parts of the image move step-wise from new frame to the next new frame. Each new frame so created is weighted in the weighting device 14 in accordance with the desired shutter characteristic, and the new frames corresponding to each input frame are then stored in the frame store 16 in summed fashion due to the feedback connection and the accumulator 15. Thus for each input frame there is created an output frame by accumulation of the corresponding interpolated new frames, in which in the output frame the moving parts of the image are blurred. After scaling by the scaling device 17 to bring the images to a required size, the output frames are supplied to the multiframe store 18. From there they can be derived to be merged in live action material in known manner using, for example, a matting technique.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of processing a first video data signal having a plurality of frames in which said first video data signal is obtained by filming single frame animation material, said method comprising the steps of:
   detecting motion of an object having an associated trajectory path in a picture sequence formed from said frames of said first video data signal; and
   blurring images represented by said frames of said first video data signal in said picture sequence of the object which is detected as being in motion so as to form a processed video data signal which is suitable for merging with a second video data signal obtained by filming live action or non-single frame animation material.

2. A method according to claim 1, in which the step of determining motion includes deriving motion vectors.

3. A method according to claim 2, in which said motion vectors are derived from a current frame and a previous frame of said first video data signal.

4. A method according to claim 2, in which said motion vectors are derived from a current frame and a subsequent frame of said first video data signal.

5. A method according to claim 1, in which the step of determining motion includes deriving a motion vector representing the motion trajectory path of said object and in which the step of blurring includes the steps of dividing the motion trajectory path of said object as represented by said motion vector into a plurality of increments each being a portion of said motion trajectory path, deriving data representing the respective image of said object at each of said increments, summing all of the image data and dividing the summed image data by the number of said increments to obtain an average image data value.

6. A method of processing a first video data signal having a plurality of input frames in which said first video data signal is obtained by filming single frame animation material, said method comprising the steps of:
   detecting motion of an object in a picture sequence formed from said input frames of said first video data signal and deriving from detected motion a motion vector which represents an associated trajectory path of said object; and
   blurring images of the object which is detected as being in motion by forming a plurality of intervening frames from each said motion vector and video data from a previous frame, a current frame and a subsequent frame of said first video data signal for each of said input frames and summing the intervening frames corresponding to each of said input frames to form respective output frames so as to form a processed video data signal having said plurality of output frames which is suitable for merging with a second video data signal obtained by filming live action or non-single frame animation material.

7. Apparatus for processing a first video data signal having a plurality of frames in which said video data signal is obtained by filming single frame animation material, said apparatus comprising:
   motion vector estimator means for deriving motion vectors representing a motion trajectory path of an object in a picture sequence formed from said frames of said first video data signal; and
   means for blurring images represented by said frames of said first video data signal in said picture sequence of the object which is determined as being in motion by said motion vectors so as to form a processed video data signal which is suitable for merging with a second video data signal obtained by filming live action or non-single frame animation material.

8. Apparatus according to claim 7, in which said motion vectors are derived from a current frame and a previous frame of said first video data signal.

9. Apparatus according to claim 7, in which said means for blurring includes vector-steered interpolator means which receives said motion vectors.

10. Apparatus according to claim 7, in which said means for blurring divides the motion trajectory path of said object as represented by one of said motion vectors into a plurality of increments each being a portion of said motion trajectory path, derives data representing the respective image of said object at each of said increments, and sums all of the image data.

11. Apparatus according to claim 7, in which said motion vectors are derived from a current frame and a subsequent frame of said first video data signal.

12. A method of processing a first video data signal having a plurality of frames in which said first video data signal is obtained by recording single frame animation material, and in which said first video data signal is recorded with a camera having a shutter which has a shutter opening characteristic associated therewith, said method comprising the steps of:
   detecting motion of an object in a picture sequence formed from said frames of said first video data signal and deriving from detected motion a motion vector which represents an associated trajectory path of said object; and
   blurring images represented by said frames of said first video data signal in said picture sequence of the object which is detected as being in motion by dividing the motion trajectory path of said object as represented by said motion vector into a plurality of increments each being a portion of said motion trajectory path, deriving data representing the respective image of said object at each of said increments, weighting the image data with said shutter opening characteristic of said camera, and summing all of said image data so as to form a processed video data signal which is suitable for merging with a second video data signal obtained by recording live action or non-single frame animation material.

13. Apparatus for processing a first video data signal having a plurality of frames in which said first video data signal is obtained by recording single frame animation material, and in which said first video data signal is recorded with a camera having a shutter which has a shutter opening characteristic associated therewith, said apparatus comprising:
   motion vector estimator means for deriving motion vectors representing a motion trajectory path of an object in a picture sequence formed from said frames of said first video data signal; and
   means, including weighting means, for blurring images represented by said frames of said first video data signal in said picture sequence of the object which is determined as being in motion by said motion vectors by dividing the motion trajectory path of said object as represented by one of said motion vectors into a plurality of increments each being a portion of said motion trajectory path, deriving data representing the respective image of said object at each of said increments, weighting the image data with said shutter opening characteristic of said camera by utilizing said weighting means, and summing all of said image data so as to form a processed video data signal which is suitable for merging with a second video data signal obtained by recording live action or non-single frame animation material.

* * * * *